US007315890B2

(12) United States Patent
Tilton et al.

(10) Patent No.: US 7,315,890 B2
(45) Date of Patent: Jan. 1, 2008

(54) SYSTEM AND METHOD FOR MANAGING ACCESS TO ACTIVE DEVICES OPERABLY CONNECTED TO A DATA NETWORK

(75) Inventors: Earl W. Tilton, Portland, OR (US); Mark K. Morehead, Beverton, OR (US); Robert M. Parent, Hillsboro, OR (US); Tommy L. Beane, Aloha, OR (US)

(73) Assignee: Lockheed Martin Corporation, Bethesda, MD (US)

( * ) Notice: Subject to any disclaimer, the term of this patent is extended or adjusted under 35 U.S.C. 154(b) by 724 days.

(21) Appl. No.: 10/263,137

(22) Filed: Oct. 2, 2002

(65) Prior Publication Data

US 2004/0068562 A1  Apr. 8, 2004

(51) Int. Cl.
G06F 15/173 (2006.01)
G06F 15/16 (2006.01)
(52) U.S. Cl. ............................ 709/223; 709/229; 726/2
(58) Field of Classification Search ................ 709/223, 709/229; 707/10; 726/2, 11, 13
See application file for complete search history.

(56) References Cited

U.S. PATENT DOCUMENTS

| 5,602,556 | A | | 2/1997 | Bowers |
| 5,835,726 | A | * | 11/1998 | Shwed et al. ................ 709/229 |
| 5,987,611 | A | | 11/1999 | Freund |
| 6,182,226 | B1 | * | 1/2001 | Reid et al. ..................... 726/15 |
| 6,338,141 | B1 | | 1/2002 | Wells |
| 6,400,271 | B1 | | 6/2002 | Davies, Jr. et al. |
| 6,496,935 | B1 | * | 12/2002 | Fink et al. ..................... 726/13 |
| 6,609,153 | B1 | * | 8/2003 | Salkewicz .................... 709/223 |
| 6,704,873 | B1 | * | 3/2004 | Underwood .................. 726/12 |
| 6,873,988 | B2 | * | 3/2005 | Herrmann et al. ............. 707/10 |
| 2002/0120732 | A1 | * | 8/2002 | Lee et al. ..................... 709/223 |
| 2003/0028624 | A1 | * | 2/2003 | Hasan et al. ................. 709/220 |
| 2003/0172145 | A1 | * | 9/2003 | Nguyen ....................... 709/223 |
| 2003/0236887 | A1 | * | 12/2003 | Kesselman et al. .......... 709/226 |

OTHER PUBLICATIONS

Getting Started with FireWall-1, published by Check Point Software Technologies, Ltd., Sep. 1998.*
Managing FireWall-1 Using the Windows GUI, published by Check Point Software Technologies, Ltd., Sep. 1998.*
FireWall-1 Architecture and Administration, published by Check Point Software Technologies, Ltd., Sep. 1998.*

(Continued)

Primary Examiner—Saleh Najjar
Assistant Examiner—V. Korobov
(74) Attorney, Agent, or Firm—Duane Morris, LLP

(57) ABSTRACT

A system and method for managing access of one or more active devices through a data network is disclosed. The system comprises a service station operative to communicate with a requesting active device and a router, the active device and router operative to communicate with a data network. Connection management software executes at least partially in the service station to direct the router to control access to a responding active device by the requesting active device based on a detectable state of a predetermined characteristic of the requesting active device, the state being disclosed to the service station upon a request by the service station. It is submitted with the understanding that it will not be used to interpret or limit the scope of meaning of the claims.

27 Claims, 7 Drawing Sheets

OTHER PUBLICATIONS www.cyber.com; CyberSoft, Inc.—Makers of The VFind S . . . oviders of Computers Security Solutions; 10 pages, no date.

techupdate.zdnet.com/techupdate/stories/main/ 0,14179,28645600,00; "Securing remote users"; 3 pages, no date.

www.okena.com; OKENA, Intrusion Prevention: Security Without Signatures; 3 pages, no date.

www.sygate.com; Sygate Technologies—Secure Enterprises Solutions for Enterprise Security; _6 pages, no date.

www.sygate.com/solutions/3_Steps_tp_trust.htm; Sygate. Technologies; 6 pages, no date.

www.sygate.com/partners/default.htm; 11 pages, no date.

\* cited by examiner

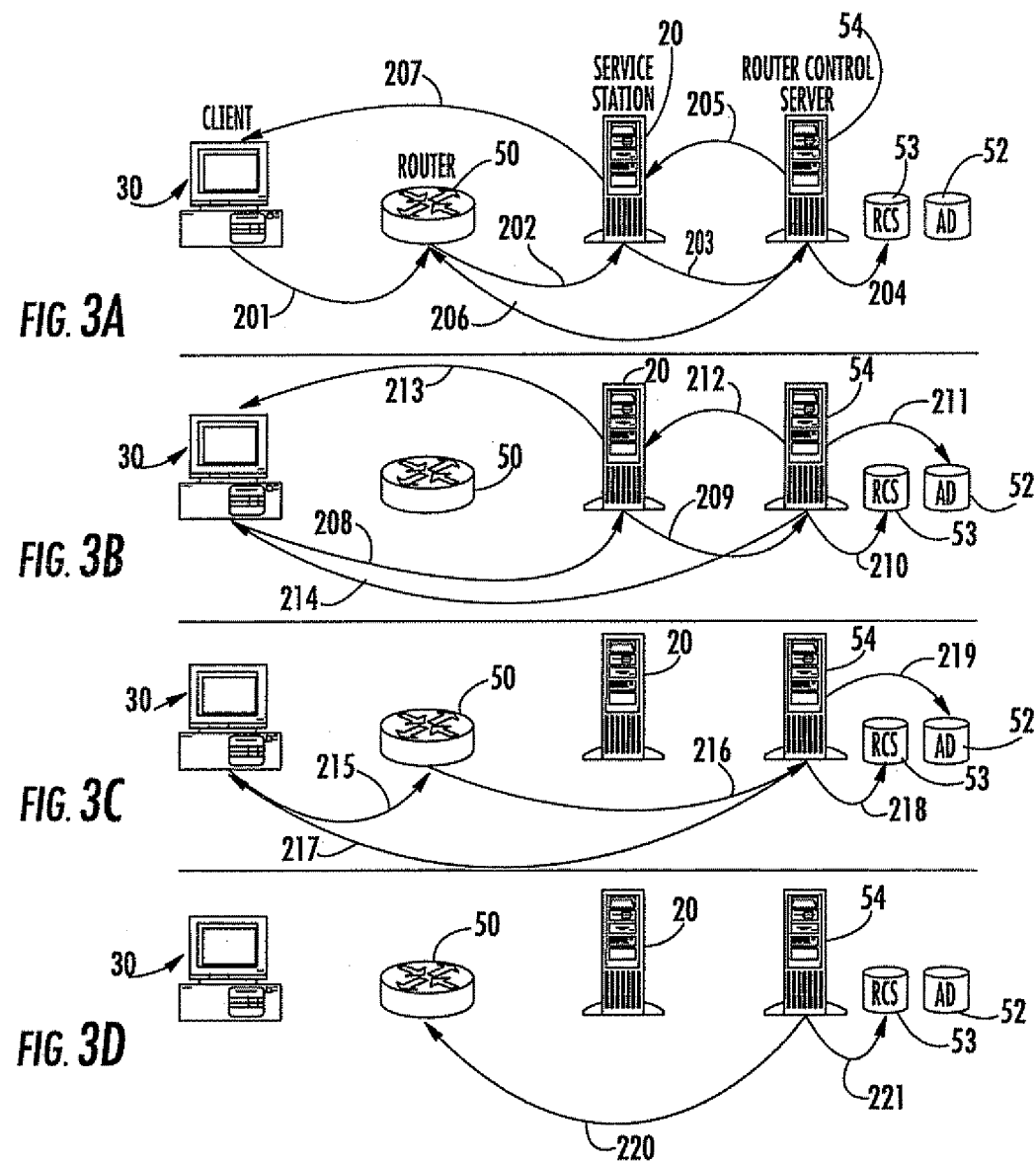

SYSTEM AND METHOD FOR MANAGING ACCESS TO ACTIVE DEVICES OPERABLY CONNECTED TO A DATA NETWORK

FIELD OF THE INVENTION

The present invention relates to management of access to a device connected to a data network from another device connected to the data network.

BACKGROUND OF THE INVENTION

In an interconnected computing environment, access to a resource such as a server or other computer or active device may give rise to vulnerabilities such as exposure to one or more viruses. Additionally, a version of software or other data, such as a database or data file, on an active device may be incompatible with versions on other active devices, leading to system difficulties or failure.

Further, it may be desirable to restrict access from an active device to another active device or other resource, e.g. restrict access to a known group of active devices or group of active devices which satisfy a minimum level of desired characteristics.

Access between active devices interconnected on a data network may be controlled, however, to disallow access between those active devices which do not meet certain standards as imposed by a "watchdog" function existing on the data network.

SUMMARY

A system and method for managing access between active devices interconnectable through a data network. In an exemplary embodiment, the system comprises a service station operative to communicate active devices and a router. Connection management software executes at least partially in the service station and at least partially at a requesting active device.

The connection management software is operable to direct the router to control access through the router by the requesting active device based on one or more detectable states of one or more predetermined characteristics of the requesting active device according to dynamically definable rules.

A service station determines if a requesting active device possesses the required state of a predetermined characteristic of the requesting active device which is acceptable according to the dynamically definable rules. Access through the router may then be denied or allowed depending on the determined state.

The scope of protection is not limited by the summary of an exemplary embodiment set out above, but is only limited by the claims

BRIEF DESCRIPTION OF THE DRAWINGS

The features, aspects, and advantages of the present invention will become more fully apparent from the following description, appended claims, and accompanying drawings in which:

FIGS. 3a through 3d are a set of process flows for an exemplary method; and

DETAILED DESCRIPTION OF THE PREFERRED EMBODIMENT

In general, throughout this description, if an item is described as implemented in software, it can equally well be implemented as hardware. It is also understood that "data," as used herein, is either singular or plural as the context requires. As used herein, "active device" comprises personal computers, other computers having a central processor unit, intelligent devices having a processor such as intelligent printers, or the like. As further used herein, "HTML" comprises generalized markup language (GML), standard generalized markup language (SGML), hypertext markup language (HTML), extensible hypertext markup language ("XML"), extensible graph markup and modeling language ("XGMML"), or the like.

Figure 1:
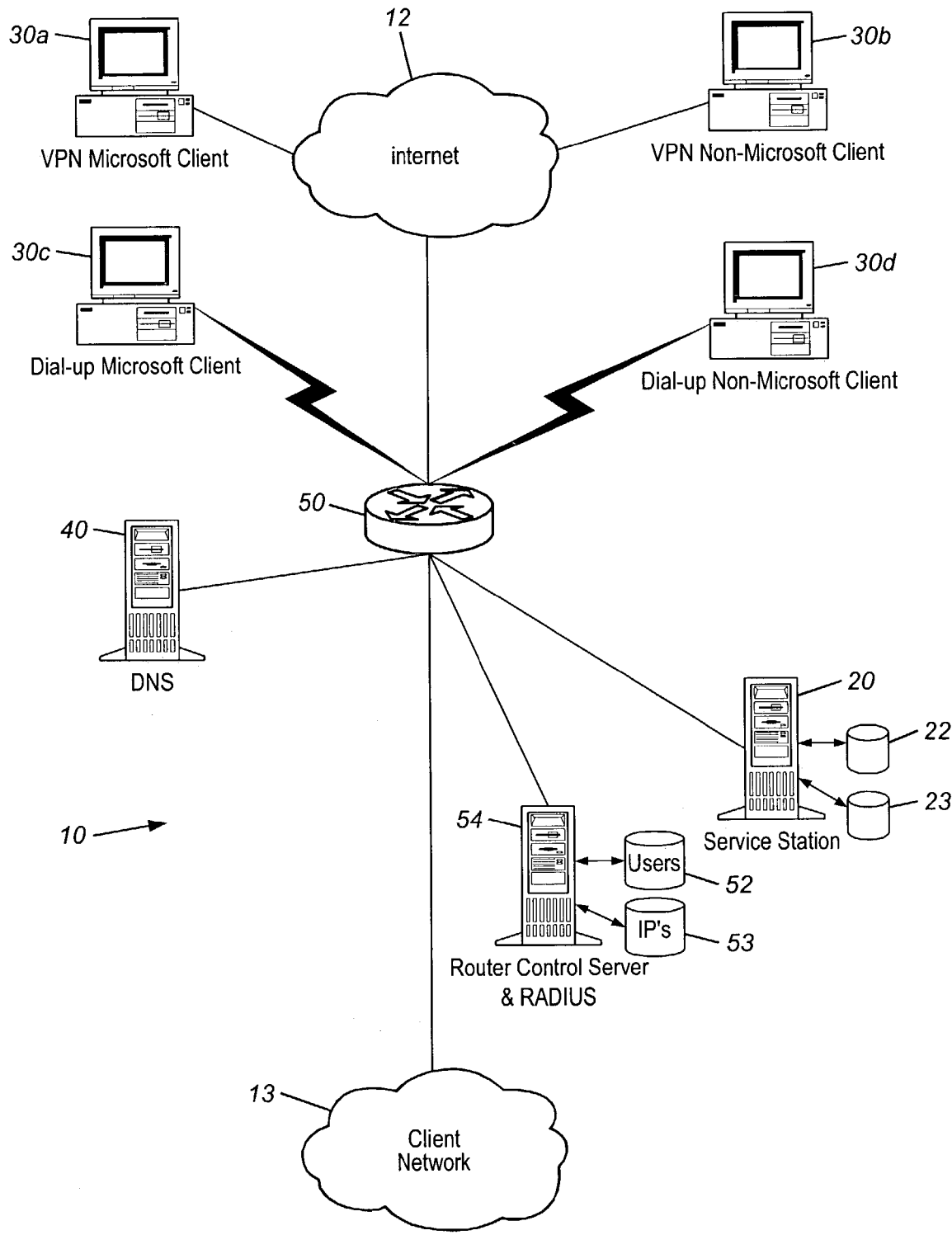
FIG. 1 is a system diagram.

FIG. 1 illustrates an exemplary computer system, shown generally as "10" in FIG. 1, whose active devices are interconnected by a data network. System 10 comprises a data network, generally indicated by the numeral "12;" at least one active device that is a requesting client, generally indicated by the numeral "30" and more specifically illustrated as devices 30a, 30b, 30c, and 30d; at least one active device that is a responding active device, e.g. server 40; and router 50.

Data network 12 comprises the Internet as well as other data networks, such as a data packet network, a TCP/IP network, a peer-to-peer network, or the like. Data network 12 may be wired, wireless, or a combination thereof. Additionally, data network 12 may comprise additional networks, e.g. private network 13, local area networks (not shown in the figures), or the like, or combinations thereof.

A first portion of active devices 30,40 operatively connected to data network 12 are disposed logically upstream from a second portion of active devices 30,40. For example, in FIG. 1, clients 30a, 30b, 30c, and 30d are logically upstream from server 40 and private network 13.

As will be familiar to those of ordinary skill in the art, router 50 is connected to data network 12 and is logically disposed intermediate the first portion of active devices 30,40 and the second portion of active devices 30,40, including private network 13. Router 50 is capable of selectively allowing access by a requesting active device, e.g. client 30a, to an active device of the second portion of active devices, e.g. server 40. In a preferred embodiment, router 50 uses a network address translation protocol ("NAT") to forward data traffic to service station 20.

Router 50 may further comprise router control server 54 which may further comprise router control message queue 52 and IP address database 53. Routers 50 such as manufactured by Cisco Systems Inc. of San Jose, Calif. are typical of routers 50 which support traffic filtering security features that dynamically filter IP protocol traffic.

Service station 20 is operative to communicate with router 50, either via data network 12, direct connection via wired or wireless data communications, integration into router 50 or router control server 54, or the like, or a combination thereof. In certain contemplated embodiments, service station 20 may be in communication with one or more active devices 30,40 such as through data network 12. Service station may further comprise service station message queue 22.

Figure 2:
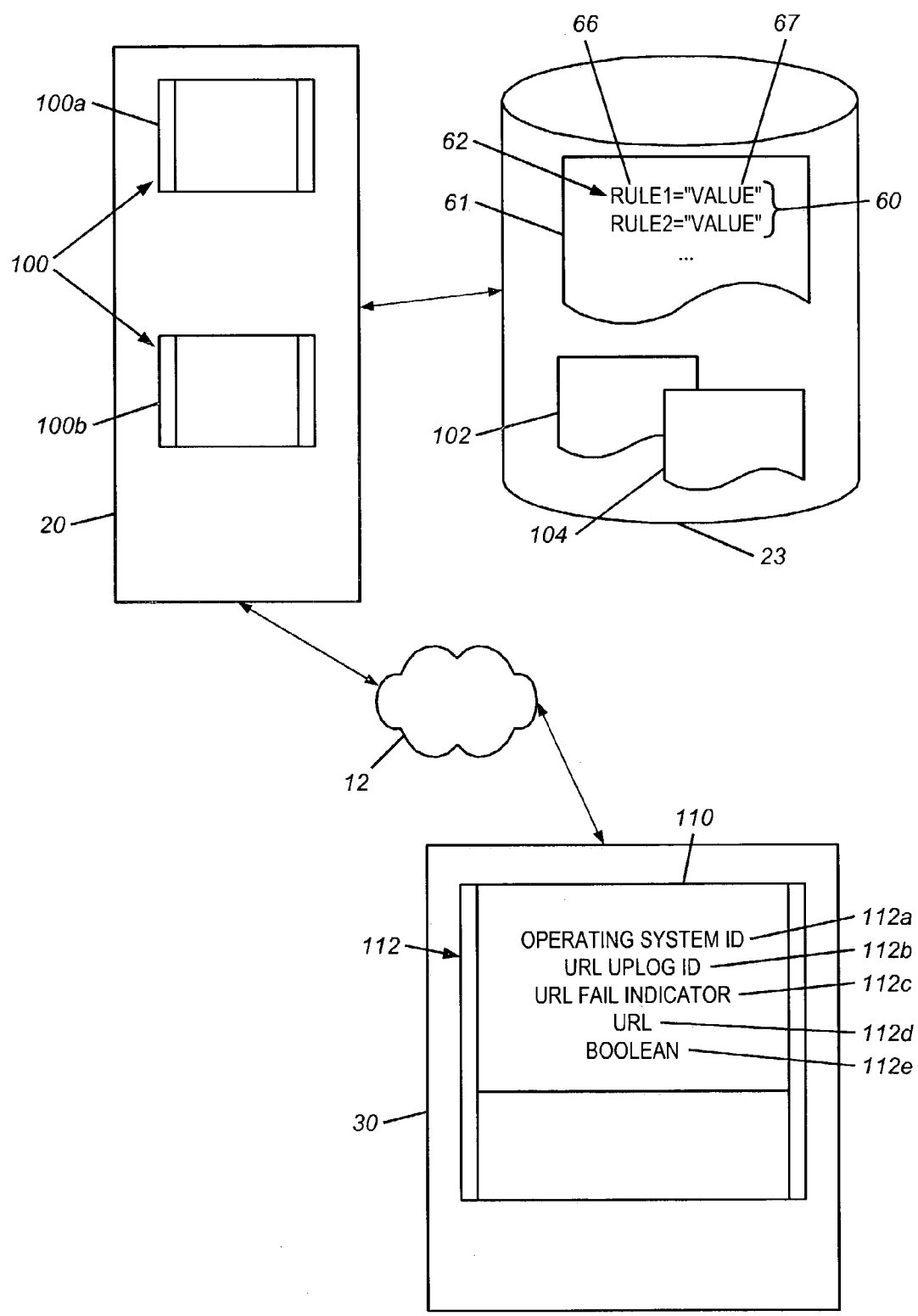
FIG. 2 is a schematic of a set of components of an exemplary embodiment of a system for managing access.

Referring now to FIG. 2, connection management software 100 executes at least partially in service station 20. Some components of connection management software 100 may reside in router control server 54 (FIG. 1). Connection management software 100 comprises functions, e.g. 100a, 100b, that allow service station 20 to direct router 50 (FIG. 1) to control access to a responding active device such as server 40 (FIG. 1) by a requesting active device such as client 30. Access may be allowed or denied based on a detectable state of a predetermined characteristic of the requesting active device, e.g. client 30. In a preferred embodiment, the desired state information is disclosed to service station 20 upon a request issued by service station 20 to client 30.

In a preferred embodiment, connection management software 100 further comprises one or more pages 102, 104 containing executable code, directives to executable code, or the like, or combinations thereof. In an exemplary embodiment, pages 102,104 are written in HTML or the like and comprise first page 102 and second page 104 controllable by service station 20 to which a confirmation code may be passed by a requesting active device, e.g. client 30.

Rule set 60 comprises a logically grouped set of rules 62 for client 30. In a preferred embodiment, each rule 62 within rule set 60 must be satisfied at client 30. As discussed below, several levels of satisfaction may exist.

Rule set 60 may be centrally stored and configured, e.g. in rule file 61 contained within persistent data store 23. In an exemplary embodiment, rule set 60 for client 30 will be in the form of a database, but tools may be provided to simplify configuration, e.g. a text editor may be used such as for rule sets 60 in text files or a specialized tool used which comprises a specialized user interface.

In an exemplary embodiment, client control software 110 executing at client 30 may be responsible for performing one or more functions at client 30 such as when requested by receipt of directives from service station 20, e.g. directives embedded within first page 102. These functions may include downloading rule set 60 from server station 20 and interpreting and being guided by rules 62 within rule set 60 to perform further functions at client 30. In an exemplary embodiment, ActiveX controls, e.g. a http request to download a rule 62, may be used to obtain rule set 60 and may be further used to process rules 62 such as those downloaded from rule set 60. In this manner, tests and results as defined by rules 62 may be dynamically definable with respect to client control software 110 at client 30.

Additionally, client control software 110 may be used to generate a log reflecting or otherwise reporting a predetermined set of actions undertaken and/or results generated at client 30 by client control software 110, upload a predetermined portion of the log such as to service station 20, and redirect client 30 to an appropriate display, e.g. page 102 or page 104, upon grant or denial of access to private network 13 (FIG. 1) by client 30, or the like, or a combination thereof.

In an exemplary embodiment, client control software 110 may comprise one or more ActiveX controls, HTML code contained in first page 102, or a combination thereof. An exemplary HTML code segment illustrating a set of parameters 112 which may be passed to client control software 110 to further define locations at which rule set 60 may be located is shown below in Table 1:

TABLE 1

```
<OBJECT classid="clsid:D0729B7A-84DD-4F3F-AC50-18BB4179ADDC"
        codebase="./LhRemoteAccess.ocx">
    <PARAM name="Win95" value="http://ServerName/win95_ruleset.ini"/>
    <PARAM name="Win98" value="http://ServerName/win98_ruleset.ini"/>
    <PARAM name="WinME" value="http://ServerName/winME_ruleset.ini"/>
    <PARAM name="WinNT" value="http://ServerName/winNT_ruleset.ini"/>
    <PARAM name="Win2K" value="http://ServerName/win2K_ruleset.ini"/>
    <PARAM name="URL_uplog" value="http://ServerName/uplog.asp"/>
    <PARAM name="URL_fail" value="Reject.asp"/>
</OBJECT>
```

In this exemplary embodiment as illustrated in Table 1, control definitions for client control software 110 may be contained within an <OBJECT> tag in first page 102. Further, in this exemplary embodiment, the "classid" attribute illustrated in Table 1 above is unique and should not be modified.

As further indicated in Table 1, rule set 60 may further comprise a codebase attribute to specify a location into which client control software 110 may be downloaded if it is not yet installed on the requesting active device, e.g. client 30. The location may be an absolute universal resource locator ("URL"), e.g. "http://servername/path/to/LhRemoteAccess.ocx," or a relative URL such as may be obtained from an hypertext markup language (HTML) page, e.g. a relative URL from an HTML page defining the <OBJECT> tag, as shown in Table 1.

Rule 62 may further comprise one or more tags to define one or more parameters 112 that may be needed by client control software 110. In an exemplary embodiment, parameter 112 may comprise operating system identifier 112a; URL uplog identifier 112b; URL fail identifier 112c; URL 112d that may be used to specify a page such as an HTML page responsible for displaying information upon denial of network access, e.g. page 104 in FIG. 4c; boolean 112e; or the like, or a combination thereof.

Operating system identifier 112a may be used to specify a URL at which rules file 61 may be accessed. Rule set 60 and/or rules file 61 may further correspond to the platform on which client 30 executes, e.g. "Win32" used to specify rule set 60 and/or rule file 61 for an operating system compliant with a 32-bit Microsoft WINDOWS® software environment, "Win95" used to specify an operating system compliant with a Microsoft WINDOWS 95® software environment, "Win98" used to specify a rules file 61 for an operating system compliant with a Microsoft WINDOWS 98® software environment, "WinME" used to specify an operating system compliant with a Microsoft WINDOWS MILLENNIUM EDITION® software environment, "WinNT" used to specify an operating system compliant with a Microsoft WINDOWS NT® software environment, "Win2K" used to specify an operating system compliant with a Microsoft WINDOWS 2000® software environment, "WinXP" used to specify an operating system compliant with a Microsoft WINDOWS XP® software environment, and the like. In a preferred embodiment, operating system identifier 112a further comprises an absolute URL definition.

URL uplog identifier 112b may be used to specify a URL usable by processes responsible for uploading the logs. The processes may comprise a script, an executable file, a portion of an HTML file, or the like, or combinations thereof.

Figure 4A:
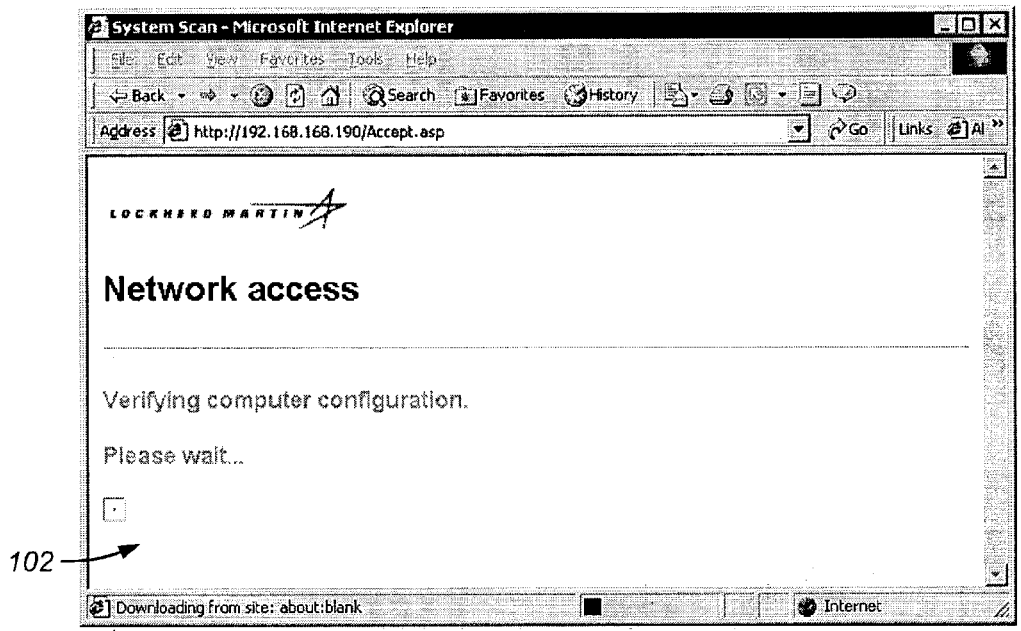
FIGS. 4a through 4e are a set of exemplary display forms.
Figure 4B:
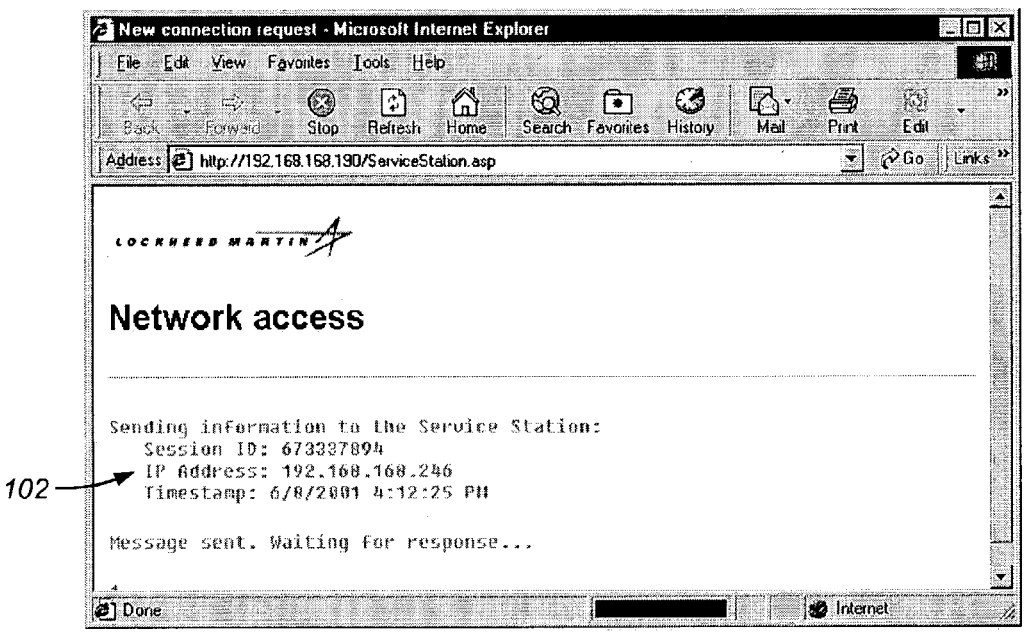
Figure 4C:
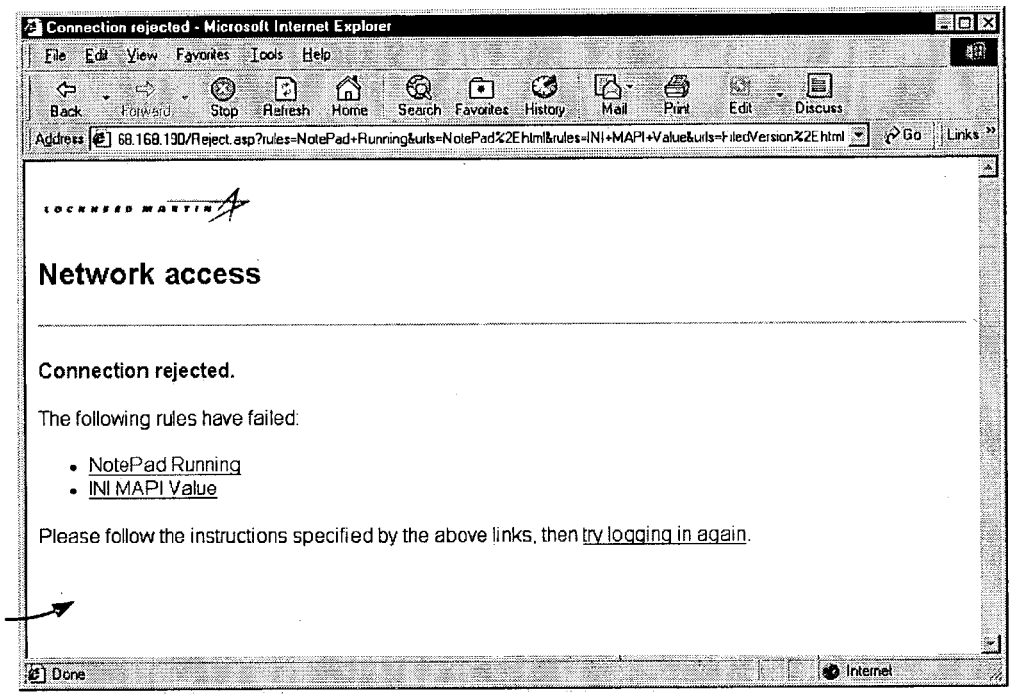

URL fail identifier 112c may be used to specify a URL which provides access to a page, e.g. page 104, responsible for displaying information upon denial of network access. For example, as shown in FIG. 4c, page 104 may be used to list a predetermined set of rules 62 which are not satisfied at client 30 and links to instruction on correcting those failures.

In a preferred embodiment, client control software 110 supports versioning. For example, the codebase attribute illustrated in Table 1 may be used to define a requested, specific version of client control software 110, e.g. of an ActiveX control. By way of example and not limitation, a codebase of "./LhRemoteAccess.ocx#version=1,0,0,16" may be used to request that client control software 110 identified as "LhRemoteAccess.ocx" at a relative URL has a version of "1.0.0.16." If a browser or other software executing in client 30 has already installed a different version of client control software 110, client control software 110 may automatically download and use the requested version of control software 110.

Rule file 61 may exist at or accessible to service station 20. Rule file 61 comprises one or more predefined rules 62. Rules 62 are dynamically definable and may further comprise a name-value pair that defines rule parameter 66 and an associated value 67.

In an exemplary embodiment, rule file 61 is a text file formatted to be compliant with a Windows INI file format and comprises one or more identifiably named sections 64. In alternative exemplary embodiments, rule file 61 may be an HTML file, a database, a table in a database, or the like. Rule file 61 may further comprise an "INI" section in rule file 61. Each INI section may further comprise a section name where the section name further comprises a name of a rule 62. In a preferred embodiment, each section name is unique within rule file 61.

A plurality of rules 62 may exist and rule file 61 may contain more than one rule 62 of the same type (for instance, two registry rules may be useful to check two different registry values) or none of a given type.

In an exemplary embodiment, rule 62 comprises one or more name-value pairs which may be of the form <name>=<value> where

<name> is the name of rule parameter 66 and

<value> is the value assigned to rule parameter 66.

Figure 2A:
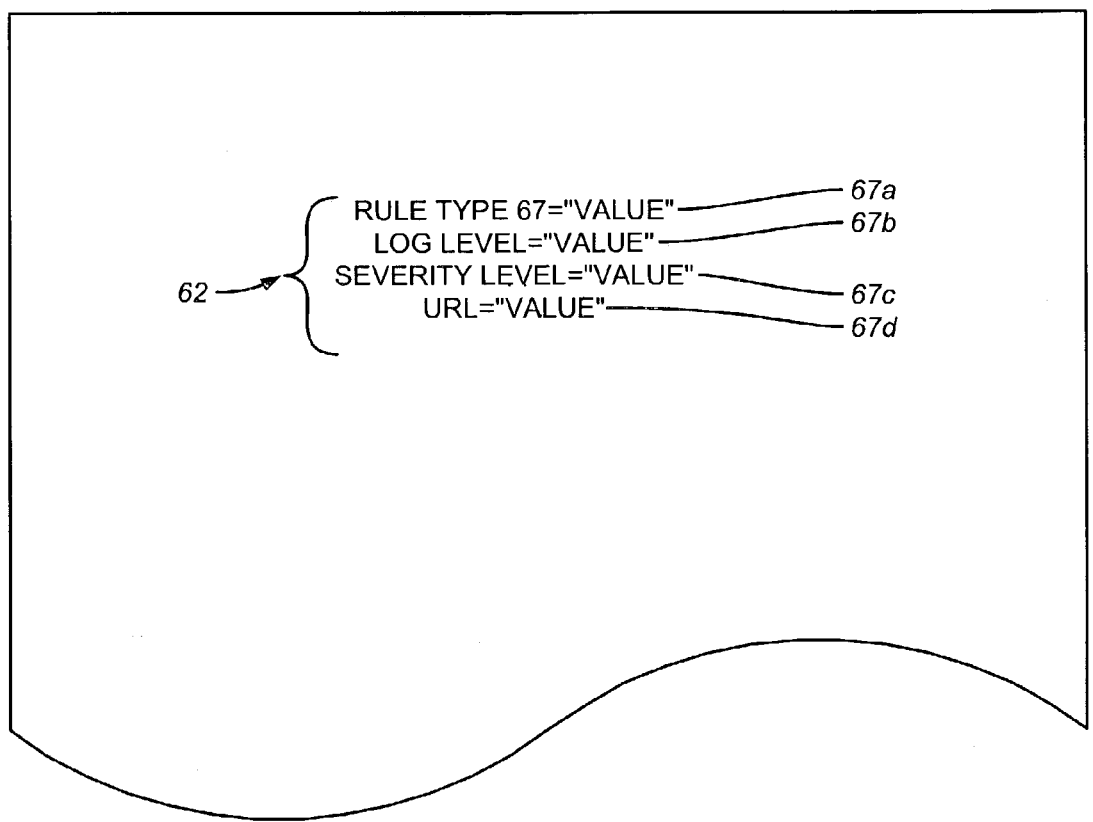
FIG. 2a is a schematic of a rule file.

Referring now to FIG. 2a, in an exemplary embodiment, each rule 62 may further comprise rule characteristics 67, including rule type 67a, log level 67b, severity level 67c, URL 67d, or a combination thereof. In an exemplary embodiment, each rule 62 may further comprise a list of name-value pairs defining parameters 67 specific to that rule 62 in addition to a common set rule parameters 66.

Rule type 67a comprises a descriptor for a type of rule 62. As shown in the exemplary tables below, rule type 67a may comprise a literal string and may be case sensitive, in which event a rule engine (not shown in the figures) will treat rule 62 as unknown and fail it should the case not match.

A log of actions taken by client control software 110 (FIG. 2) may be generated at client 30 and captured by a desired computer such as service station 20 (FIG. 2). Log level 67b may be used to define a level of logging in log file 101. In an exemplary embodiment, log level 67b may indicate no logging, a minimum set of logging information such as "pass" or "fail," or a maximum set of logging information such as information that includes values read from rule 62. Log files 101 may further be stored in a specified folder at the computer, e.g. service station 20. In an exemplary embodiment, log file 101 may be created using a naming convention to further facilitate access management, e.g. "<remote-ip>—<remote-hostname>—<timestamp>.log" where "<remote-ip>" is the IP address of the remote machine accessing the network, e.g. client 30; "<remote-hostname>" is the hostname of the remote machine, e.g. client 30; "<timestamp>" is the timestamp which may be of the form YYYYMMDDhhmmss where "YYYY" is a four-digit year, "MM" is the two-digit month, "DD" is the two-digit date, "hh" is the two-digit 24-hour based, "mm" is the two-digit minute, and "ss" is the two-digit second of when log file _____ was created.

Figure 4D:
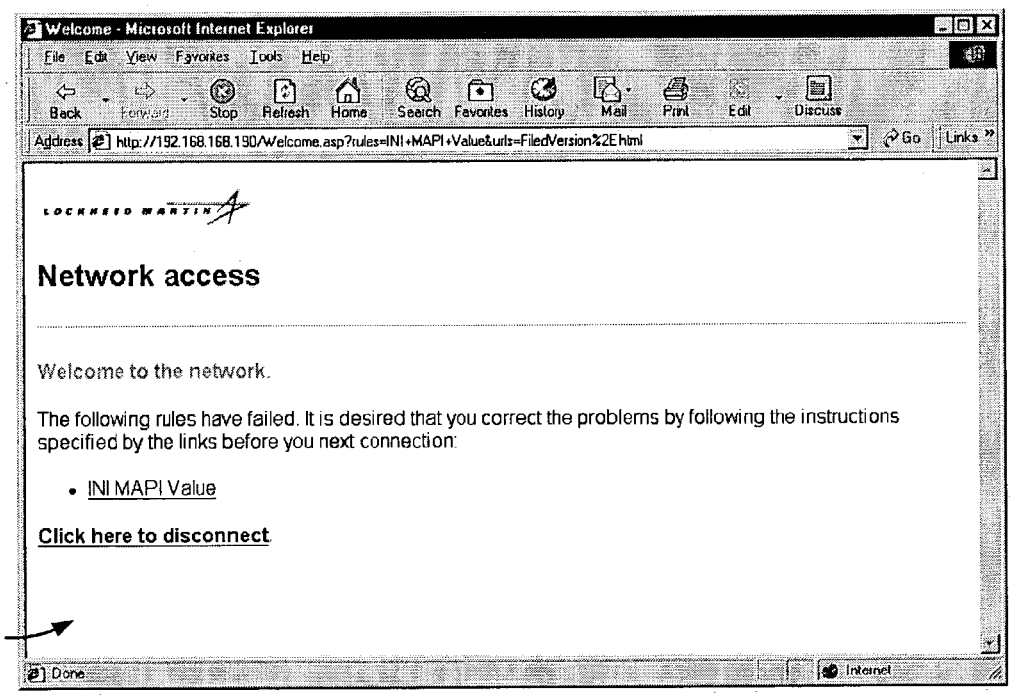
Figure 4E:
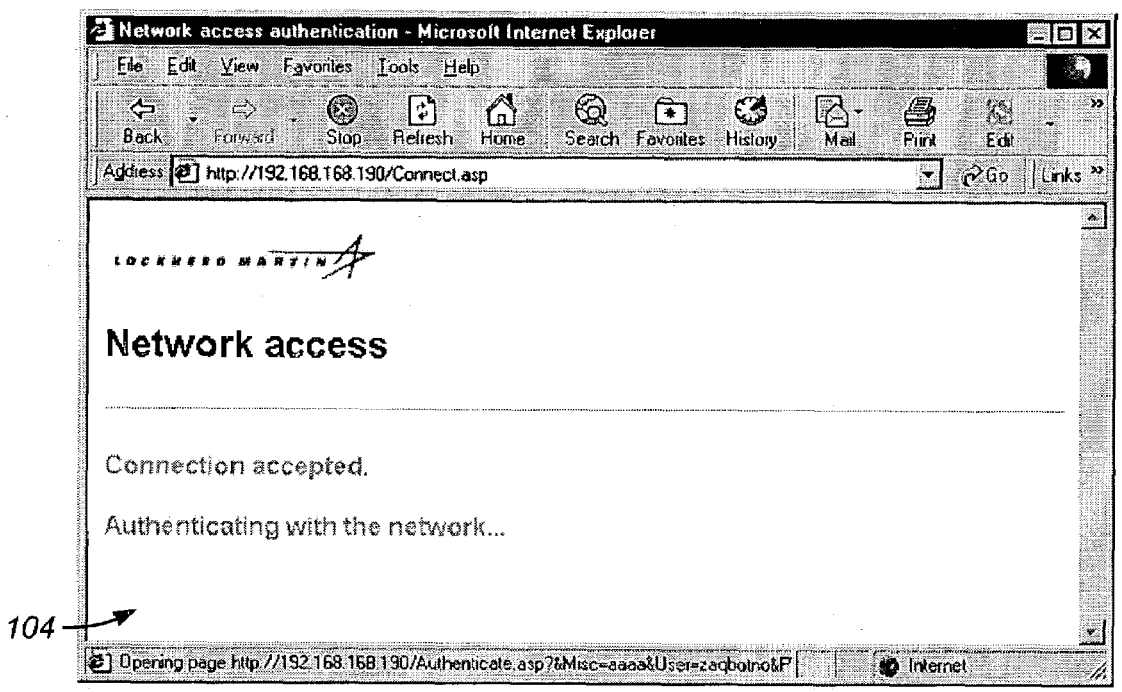

Severity level 67c may comprise a descriptor indicating a consequence of a failure of client 30 (FIG. 2) to comply with the related rule 62. In an exemplary embodiment, severity level 67c may include "required," to indicate that a failure to comply with rule 62 is to be noted, e.g. form 104 in FIG. 4c, and prevents client 30 from accessing private network 13 (FIG. 1) or active devices 40 (FIG. 1) such as by a denial of network access by service station 20 (FIG. 1) and/or router 50 (FIG. 1); "desired," to indicate that a failure to comply with rule 62 is to be noted, e.g. on page 104 (FIG. 4d), as a failure of one or more criteria of rule 62 but does not prevent further access by client 30 to private network 13 or active devices 40; "minimal," to indicate that failure to comply with rule 62 is logged such as to log file 101 but not noted, e.g. on page 104 (FIG. 4e), as a failure and does not prevent further access by client 30 to private network 13 or active devices 40; and/or "off" which may be used to disable rule 62, in which case a rule engine (not shown in the figures) will not attempt to evaluate rule 62. "Off" may be used to ease management of rules 62 by allowing selective enablement of a rule 62 without having to delete that rule 62.

URL 67d comprises a URL descriptor to a page such as page 104 (FIG. 2) containing instructions on how to set up client 30 (FIG. 2) to be in compliance with rule 62.

Referring back to FIG. 2, in an exemplary embodiment, rules 62 may comprise a command rule 62, a file exist rule 62, a file property rule 62, an INI rule 62, a process rule 62, a registry rule 62, or a combination thereof.

Command rule 62 may be used to direct client control software 110 to execute a specified command at client 30. An exemplary command rule 62 is illustrated in Table 2:

TABLE 2

[Run NotePad]
RuleType=CommandRule
LogLevel=max
Severity=Required
URL=/Instructions/RunCommand.html
Command=%windir%\notepad.exe In this example, client control software 110 is directed to execute an application named "NotePad."

File exist rule 62 may be used to direct client control software 110 to check for the existence of a described file at client 30. An exemplary file exist rule 62 is illustrated in Table 3:

TABLE 3

[Win.ini Exists]
RuleType=FileExistRule
LogLevel=none
Severity=Required
URL=FlagFile.html
FileName=%windir%\win.ini
Exists=True File property rule 62 may be used to direct client control software 110 to check for one or more specific properties of a given file which may be specified by a "property" parameter for file property rule 62. In an exemplary embodiment, file properties comprise version, date/time, and attribute. An exemplary file property rule 62 is illustrated in Table 4:

TABLE 4

[File Version]
RuleType=FilePropertyRule
LogLevel=min
Severity=Required
URL=FileVersion.html
FileName=%windir%\system32\Calc.exe
Property=Version
Operator=
Value=4.00

INI rule 62 may be used to direct client control software 110 to check for an INI value in a desired INI file. Table 5 illustrates an exemplary INI rule:

TABLE 5

[INI MAPI Value]
RuleType=INIRule
LogLevel=max
Severity=Desired
URL=FiledVersion.html
INIFile=%windir%\Win.ini
INISection=Mail
INIValue=MAPI
Operator=
Data=2

Alternative formats may be used for rule file 61. For example, Table 5a illustrates an exemplary HTML implementation of the rule 62 illustrated in Table 5:

TABLE 5a

<Rule name="INI MAPI Value"
RuleType="INIRule"
LogLevel="max"
Severity="Desired"
URL="FiledVersion.html"
INIFile="%windir%\win.ini"
INIValue="MAPI"
Operator=""
Data="2"/>

Process rule 62 may be used to direct client control software 110 to check whether a desired process is running at client 30. Table 6 illustrates an exemplary process rule 62 which directs client control software 110 to determine whether an application named "NotePad" is currently executing at client 30:

TABLE 6

[NotePad Running]
RuleType=ProcessRule
LogLevel=max
Severity=Required
URL=NotePad.html
Process=notepad.exe
Running=false The "running" characteristic may be used to specify the desired state of the application or process, e.g. whether the process must or must not be running.

Registry rule 62 may be used to provide client control software 110 with information required to check for a specific key value in a registry of the operating system executing in client 30. Table 7 illustrates an exemplary descriptor of registry rule 62:

TABLE 7

RuleType=RegistryRule
LogLevel=max
Severity=Required
URL=BuildVersion.html
Hive=HKEY_LOCAL_MACHINE
Key=SOFTWARE\Microsoft\Windows NT\CurrentVersion
Field=CurrentBuildNumber
Type=REG_SZ
Operator=>=
Data=1381

In Table 7 "hive" is the name of registry hive; "key" is a full path to the desired key; "field" is a name for the field of interest; "type" is that field's type as defined in the registry, e.g. "REG_SZ" for strings, "REG_DWORD" for numbers, or "REG_BINARY" for binary data; "data" is a value against which the registry value will be compared; and "operator" is a comparison operator by which the current value in the registry will be compared to the desired value, e.g. ">" for strictly superior, ">=" for superior or equal, "=" for equality, "<=" for less or equal, "<" for strictly less, or "!=" for different.

By way of further example, Table 8 illustrates an exemplary HTML version of rule file 61 comprising rule set 60 named "Win95":

TABLE 8

<RuleSet name="Win95">
    <Rule name="INI MAPI Value"
        RuleType="INIRule"
        LogLevel="max"
        Severity="Desired"
        URL="FiledVersion.html"
        INIFile="%windir%\win.ini"
        INIValue="MAPI"
        Operator=""
        Data="2"/>
    <Rule name="NotePad Running"
        RuleType="ProcessRule"
        LogLevel="max"
        Severity="Required"
        URL="NotePad.html"
        Process="notepad.exe"
        Running="false"/>
</RuleSet>

In the example shown in Table 8, the "Win95" Rule Set comprises two rules 62, "INI MAPI Value" and "NotePad Running".

In the operation of an exemplary method, referring back to FIG. 1, access to desired active devices such as server 40, e.g. through private network 13, may be managed by allowing service station 20 to determine if a requesting active device, e.g. client 30, possesses a state of one or more predetermined characteristics which is acceptable to one or more predefined criteria for that state. If the requesting active device, e.g. client 30, does possess that state, client 30 will be allowed access to a responding active device, e.g. server 40, by the requesting active device, e.g. client 30, only if the state of the predetermined characteristic is acceptable to the predefined criterion for that state.

FIG. 3a through FIG. 3d illustrate a process flow for an exemplary method. As illustrated in FIG. 3a, a request for access is received at router 50, operative to communicate with data network 12, from a first active device, e.g. client 30, which is also operative to communicate with data network 12. The request may comprise a request to access a second active device operative to communicate with data network 12, e.g. server 40.

Router 50, as described below, blocks access by the first active device, e.g. client 30, to the second active device, e.g. server 40, and forwards the request for access to service station 20. Service station 20 causes a request for information, e.g. first page 102 (FIG. 2) comprising rules 62, to be delivered to the requesting active device. Access by the requesting active device to the second active device will be allowed only if the requesting active device returns an acceptable response to the request for information, e.g. if all rules 62 are satisfied.

By way of example, in an exemplary embodiment software executing in client 30, such as an Internet browser, browses to an IP address of router 50 (step 201). Router 50 may uses a protocol, e.g. network address translation (NAT), to forward data traffic from client 30 to service station 20 (step 202). Service station 20 sends a message, e.g. containing an IP address of and indicating a new client, to message queue 52 at or controlled by router control server 54 (step 203). Router control server 54 updates IP address database 53 with the IP address of the pending connection, i.e. the IP address of client 30 (step 204). Router control server 54 further sends a message, e.g. comprising a directive to accept a client, to message queue 22 at service station 20 (step 205). In an exemplary embodiment, router control server 54 determines if a connection exists between router 50 and client 30, and, if there is an existing connection, router control server 54 clears it from router 50 (step 206).

In response to its request to access a downstream active device intercepted by router 50, client 30 is provided access to and downloads welcome page 102 (FIG. 4a) from service station 20 (step 207). Welcome page 102 may comprise client control software 110 and/or directives for client control software 110. Message area 102a (FIG. 4b) in welcome page 102 may be used to provide feedback to requesting active device 30.

Using directives provided at least partially in welcome page 102, e.g. rules 62 (FIG. 2), client control software 110 examines client 30 and determines the state of one or more components of client 30 pursuant to rules 62. For example, client control software 110 may be directed to determine if a desired component exists at the requesting active device and one or more predetermined characteristics of the component if it exists.

If the requesting active device, e.g. client 30, does not satisfy all required rules 62, client 30 may be presented with a resource to change the state to satisfy each of the predefined criteria, e.g. within each rule 62, if the state is not acceptable to the predefined criterion for that state. For example, as illustrated in FIG. 4c, client 30 may be presented with an opportunity to update non-compliant component if the predetermined characteristic is not at an acceptable level such as by using page 104. As an example, in FIG. 4c, hyperlinks 104a are provided to allow a user at requesting active device 30 to access further resources to correct deficiencies uncovered at requesting active device 30.

Referring now to FIG. 3b, after client control software 110 has examined client 30, if all criteria of rules 62 are met by client 30 client control software 110 may redirect the software, e.g. the browser, to a new page, e.g. page 104 (FIG. 2) on service station 20, passing it a confirmation code (step 208).

Upon receipt of the confirmation code, service station 20 sends a message, e.g. a connection request message, to message queue 52 of router control server 54 (step 209). Router control server 54 updates IP address database 53 with data reflecting a successful scan of client 30 (step 210) and creates a new user account in the domain (step 211). Router control server 54 further sends a message, e.g. a connection approval message, to message queue 22 of service station 20 (step 212). Service station may present a user name and password to the software executing in client 30, e.g. browser software (step 213). Additionally upon a successful scan, router control server 54 may begin pinging client 30, waiting for a response (step 214).

Referring now to FIG. 3c, client 20 may then supply router 50 with the supplied user name and password, such as by using a known protocol such as Telnet (step 215). Router 50 may verify the user name and password, e.g. with software executing at router control server 54. Once authenticated, router creates a dynamic access list for the client (step 216). Router control server 54 may receive a ping reply from the client (step 217) and update a status entry for client 30 in IP address database 53 (step 218). After updating the status, router control server 54 may then delete the user name from the domain (not shown in the figures) (step 219) and, after client 30 disconnects, no longer receive ping replies.

As further illustrated in FIG. 3d, router control server 54 may use a protocol to communicate with router 50, e.g. Telnet, to request that router 50 remove an access list for client 30 (step 220). Router control server 54 may then remove the IP address of client 30 from IP address database 53 (step 221).

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A system for managing access between active devices through a data network, comprising:

a. a plurality of active devices operative to communicate with a data network, a first portion of the active devices being disposed logically upstream from a second portion of the active devices;

b. a router, logically disposed intermediate the first portion of the active devices and the second portion of the active devices, the router capable of selectively allowing access by a requesting active device of the first portion of the active devices to an active device of the second portion of active devices;

c. a service station operative to communicate with the at least one active device and the router;
d. connection management software executing at least partially in the service station and operable to direct the router to selectively allow access by a requesting active device to a responding active device in the second portion of active devices based on a predetermined characteristic of the requesting active device; and
e. client software executing in a requesting active device and in communication with the connection management software, the client software operable to determine the predetermined characteristic of the requesting active device according to a dynamically definable rule;
wherein the predetermined characteristic is selected from the group consisting of the state of the requesting active device, the existence of a file on the requesting active device, the existence of one or more properties of a given file on the requesting active device, an INI value in an INI file on the requesting active device, whether a particular process is running on the requesting active device, and whether a key value exists in a registry of an operating system executing in the requesting active device.

2. A system as in claim 1, wherein:
a. the data network is at least one of (i) a data packet network, (ii) a TCP/IP network, or (iii) a peer-to-peer network.

3. A system as in claim 1, wherein:
a. the active devices comprise a logic processing unit.

4. A system as in claim 1, wherein:
a. the router uses a predefined protocol to forward data to the service station.

5. A system as in claim 4, wherein:
a. the predefined protocol comprises network address translation.

6. A system as in claim 1, wherein the router further comprises:
a. a router control server, comprising;
i. a control server message queue; and
ii. an IP Address database.

7. A system as in claim 1, wherein:
a. the service station further comprises a service station message queue.

8. A system as in claim 1, wherein:
a. the connection management software further comprises
i. a first page, retrievable by the requesting active device, the first page comprising at least a portion of client control software executable at the requesting active device; and
ii. a second page, controllable by the service station, through which a confirmation code may be passed to the service station by the client control software executing at the requesting active device.

9. A system as in claim 8, wherein:
a. the client control software further comprises an ActiveX control; and
b. the first page further comprises a codebase attribute to specify a location into which the ActiveX control may be downloaded if it is not yet installed on the requesting active device.

10. A system as in claim 9, wherein:
a. the location is at least one of (i) an absolute URL or (ii) a relative URL.

11. A system as in claim 9, wherein:
a. the ActiveX control supports versioning.

12. A system as in claim 9, wherein:
a. the first page further comprises a tag to define a rule parameter needed by the client control software.

13. A system as in claim 12, wherein:
a. the rule parameter further comprises at least one of (i) an operating system identifier, (ii) a URL uplog, (iii) a URL fail, (iv) a URL useful to specify a page responsible for displaying information upon denial of network access, or (v) a boolean.

14. A system as in claim 12, wherein the rule parameter further comprises:
a. at least one of (i) a rule type, (ii) a log level, (iii) a severity level, or (iv) a URL.

15. A system as in claim 14, wherein;
a. the rule type further comprises at least one of (i) a command rule, (ii) a file exist rule, (iii) a file property rule, (iv) a named section rule, (v) a process rule, or (vi) a registry rule;
b. the log level further comprises at least one of (i) none, (ii) min, or (iii) max;
c. the severity code further comprises at least one of (i) off, (ii) minimal, (iii) desired, or (iv) required; and
d. the URL further comprises a URL providing access to a page containing instructions on how to set up the client machine in compliance wit the rule.

16. A system as in claim 15, wherein:
a. the registry rule comprises directives for the client control software control to direct the Client control software control to check for a specific key value in a registry of an operating system;
b. the process rule comprises directives for the client control software control to direct the client control software control to check whether a process is executing in the requesting active device;
c. the file exist rule comprises directives for the client control software control to direct the client control software control to check for the existence of a given file at the requesting active device;
d. the file property rule comprises directives for the client control software control to direct the client control software control to check for specific properties of a given file at the requesting active device, the file property rule further comprising at least one of (i) a version indicator, (ii) a date/time indicator, or (iii) an attribute indicator;
e. the named section rule comprises directives for the client control software control to direct the client control software control to check for an named section value in a rule file; and
f. the command rule comprises directives for the client control software control to direct the client control software control to run a specified command on the client machine.

17. A system as in claim 1, further comprising:
a. a rule file, comprising the rule.

18. A system as in claim 17, wherein:
a. the rule comprises a name-value pair that defines a named parameter and a value associated with the named parameter.

19. A system as in claim 17, wherein:
a. the rule file comprises an identifiable named section; and
b. the identifiable named section comprises a unique section name, the section name further comprising the name of the rule.

20. A method for managing access, comprising:
a. receiving a request at a router, operative to communicate with a first data network, from a first active device operative to communicate with the data network, the request comprising a request to access at least one of (i) a second data network, (ii) a second active device operative to communicate with the first data network, or (iii) a second active device operative to communicate with the second data network;
b. blocking further access by the router of the first active device;
c. forwarding the request for access by the router to a service station;
d. sending a request for information by the service station to the first active device, the request for information relating to a predetermined characteristic of the first active device and comprising a dynamically definable rule; and
e. allowing access through the muter to the second active device only if the first active device returns an acceptable response to the request for information;
wherein the predetermined characteristic is selected from the group consisting of the state of the first active device, the existence of a file on the first active device, the existence of one or more properties of a given file on the first active device, an INI value in an INI file on the first active device, whether a particular process is running on the first active device, and whether a key value exists in a registry of an operating system executing in the first active device.

21. A method as in claim 20, further comprising:
a. using a predefined protocol by the access router to forward data to a service station.

22. A method as in claim 21, wherein:
a. the predefined protocol comprises network address translation.

23. A method as in claim 20, further comprising:
a. sending a new client message by the service station to a router control server message queue controlled by a router control server, the router control server operative to communicate with the router and the service station; and
b. updating by router control server of an IP Address database with the address of a connection request from the requesting active device.

24. A method as in claim 23, further comprising:
a. sending a client accept message by the router control server to a service station message queue managed by the service station;
b. determining if a connection currently exists between the router and the requesting active device; and
c. clearing of the connection if it exists by the router control server from the router.

25. A method as in claim 20, further comprising:
a. providing a welcome page containing an ActiveX control by the service station to the requesting active device; and
b. examining a predetermined set of characteristics of the requesting active device using the Active X control according to at least one rule accessible to the Active X control.

26. A method as in claim 20, further comprising:
a. redirecting software executing in the requesting active device to a predetermined page accessible on the service station; and
b. using client control software to pass a confirmation code to the service station.

27. A method as in claim 20, further comprising:
a. sending a message by the service station to the router control server message queue;
b. updating by the router control server of the IP Address database with the an IP address of a requesting active device upon a successful scan of the requesting active device by client control software;
c. creating by the muter control server of a new user account in a router list of acceptable active devices;
d. sending by the router control server of a connection approval message to the service station message queue; and
a. presenting by the service station of a user name and password to software executing at the requesting active device.

* * * * *